United States Patent
Easley et al.

(10) Patent No.: US 8,264,698 B2
(45) Date of Patent: Sep. 11, 2012

(54) DEVICE FOR THERMAL ISOLATION OF A LASER TRACKER

(75) Inventors: Samuel Joseph Easley, Saint Peters, MO (US); Keith Allan Young, Saint Peters, MO (US)

(73) Assignee: The Boeing Company, Chicago, IL (US)

( * ) Notice: Subject to any disclaimer, the term of this patent is extended or adjusted under 35 U.S.C. 154(b) by 716 days.

(21) Appl. No.: 12/364,678

(22) Filed: Feb. 3, 2009

(65) Prior Publication Data
US 2010/0195117 A1  Aug. 5, 2010

(51) Int. Cl.
*G01B 11/14* (2006.01)
(52) U.S. Cl. .......................... 356/614; 33/503
(58) Field of Classification Search .......... 356/614–623, 356/244, 246; 33/503; 219/69.11, 69.15
See application file for complete search history.

(56) References Cited

U.S. PATENT DOCUMENTS

| | | | |
|---|---|---|---|
| 4,763,420 A * | 8/1988 | McCabe et al. | 33/503 |
| 4,825,084 A | 4/1989 | Braunlich et al. | |
| 5,469,454 A | 11/1995 | Delfyett, Jr. | |
| 5,847,348 A * | 12/1998 | Allison | 219/69.11 |
| 6,821,787 B2 | 11/2004 | Neilson et al. | |
| 6,835,574 B2 | 12/2004 | Neilson et al. | |
| 7,804,602 B2 * | 9/2010 | Raab | 356/614 |

* cited by examiner

*Primary Examiner* — Hoa Pham
(74) *Attorney, Agent, or Firm* — Yee & Associates, P.C.

(57) ABSTRACT

In one advantageous embodiment, an apparatus may comprise a first plate, a second plate, and an isolation plate. The first plate may be capable of receiving a mounting member for a tool requiring an operating temperature that remains substantially constant for operation of the tool. The second plate may be capable of being secured to an object. The isolation plate may be located between the first plate and the second plate. The first plate, the second plate, and the isolation plate may be secured to each other. The insulating plate may be capable of thermally isolating the tool from the object.

21 Claims, 9 Drawing Sheets

DEVICE FOR THERMAL ISOLATION OF A LASER TRACKER

BACKGROUND INFORMATION

1. Field

The present disclosure relates generally to measurement devices and, in particular, to a method and apparatus for mounting a measurement device to an object. Still more particularly, the present disclosure relates to a method and apparatus for mounting a laser tracker in thermal isolation from an object to which the laser tracker is mounted.

2. Background

When manufacturing parts, it may be desirable to measure the physical characteristics of the part. These measurements may be made to determine whether the measurements are within tolerances or allowed thresholds for the part. These types of measurements may be made to perform quality control and to determine whether adjustments may be needed to the manufacturing process.

A coordinate measuring machine may be a device that may be used to measure physical characteristics of a part. This type of machine may be manually controlled and/or computer controlled. Measurements may be defined by a probe attached to a moving axis of the machine. This probe may collect information about various points on the surface of the part.

A coordinate measuring machine may have three axes that may be orthogonal to each other in a three-dimensional coordinate system. Each of these axes may have an extremely accurate scale system to indicate the location of the axes. The different measurements may be used to identify a size and position of the points.

One type of coordinate measuring machine may be a laser tracker. A laser tracker may use a laser beam that may be projected against the surface of the object. With a laser tracker, many points may be taken and used to check the size and position of a part. Further, these points also may be used to create a three-dimensional image of the part.

A laser tracker may be placed on an object, such as a tripod, a tool, a table, or some other suitable mounting object. A laser tracker may require a period of time to warm up. This warm-up time may be needed to avoid a drift and/or error in measurements. The warm up may be for electronics within the laser tracker. For example, the laser tracker may operate at a temperature range from around 75 degrees to around 80 degrees.

The warm up also may be needed to ensure that measurements do not vary. For example, if the housing in a laser tracker is made of aluminum, as the temperature increases, the size of the aluminum base may change in dimensions. This change may result in measurements that may vary. Drifting of measurements may be undesirable because these drifts may affect accuracy.

When a laser tracker is placed on a tool, the tool may have a temperature lower than the operating temperature of the laser tracker, such as, for example, around 65 degrees Fahrenheit. The temperature gradient between the operating temperature for the laser tracker and the temperature of the tool may cause heat to be transferred from the laser tracker to the tool until a thermal equilibrium occurs. In other words, the tool may act as a heat sink. While this temperature gradient is present, a drift in measurements may occur. The amount of time needed to warm up a laser tracker placed on a tool may be around 20 to around 36 hours.

The amount of time needed to warm up a laser tracker may increase the time needed to manufacture parts. This increase in time may delay manufacturing of parts until measurements can be made. Further, if parts are manufactured during the warm-up time and measurements later show that the parts may be out of tolerance, then those parts may need to be discarded and/or reworked.

Accordingly, there is a need for a method and apparatus that takes into account one or more of the issues discussed above, as well as possibly other issues.

SUMMARY

In one advantageous embodiment, an apparatus may comprise a first plate, a second plate, and an isolation plate. The first plate may be capable of receiving a mounting member for a tool requiring an operating temperature that remains substantially constant for operation of the tool. The second plate may be capable of being secured to an object. The isolation plate may be located between the first plate and the second plate. The first plate, the second plate, and the isolation plate may be secured to each other. The insulating plate may be capable of thermally isolating the tool from the object.

In another advantageous embodiment, a measurement system may comprise an object, a coordinate measurement machine, a laser tracker, and a thermal isolation device. The object may be selected from one of a tripod, a table, and a tool. The thermal isolation device may comprise a first plate, a second plate, an isolation plate, a plurality of channels, a plurality of fasteners in the plurality of channels, and a plurality of insulating bushings. The first plate may be capable of receiving a mounting member for the coordinate measurement machine. The first plate may be comprised of a material selected from one of steel, brass, titanium, and a carbon fiber. The second plate may be capable of being secured to an object. The second plate may have a threaded member capable of being coupled to a channel in the object. The second plate may be comprised of a material selected from one of steel, brass, titanium, and a carbon fiber. The isolation plate may be located between the first plate and the second plate. The first plate, the second plate, and the isolation plate may be secured to each other, and the insulting plate may be capable of thermally isolating the laser tracker from the object. The isolation plate may be comprised of a material having a thermal conductivity capable of reducing an amount of heat conducted from the laser tracker to the object. The isolation plate may be comprised of a material selected from one of plastic, mica, wood, and ceramic. The plurality of channels may extend through the first plate, the second plate, and the isolation plate. The plurality of fasteners may secure the first plate, the second plate, and the isolation plate to each other. The plurality of insulating bushings may be located in at least a portion of the plurality of channels extending through the first plate. The plurality of insulating bushings may insulate the plurality of fasteners from the first plate.

In yet another advantageous embodiment, a method for operating a coordinate measurement machine may be present. The coordinate measurement machine may be secured to an object with a thermal isolation device to form a secured coordinate measurement machine. Measurements may be made using the secured coordinate measurement machine.

In still yet another advantageous embodiment, a method for operating a laser tracker is present. A coordinate measurement machine may be secured to an object with a thermal isolation device to form a secured laser tracker. A period of time may be waited for until the secured laser tracker may be capable of making measurements with a desired accuracy. The measurements may be made using the secured laser tracker after the period of time has passed. The thermal isolation device may comprise a first plate, a second plate, an isolation plate, a plurality of channels, a plurality of fasteners in the plurality of channels, and a plurality of insulating bushings. The first plate may be capable of receiving a mounting member for the coordinate measurement machine. The first plate may be comprised of a material selected from one of steel, brass, titanium, and a carbon fiber. The second plate may be capable of being secured to the object. The second plate may a threaded member capable of being coupled to a channel in the object. The second plate may be comprised of a material selected from one of steel, brass, titanium, and a carbon fiber. The isolation plate may be located between the first plate and the second plate. The first plate, the second plate, and the isolation plate may be secured to each other, and the insulating plate may be capable of thermally isolating the laser tracker from the object. The isolation plate may be comprised of a material having a thermal conductivity capable of reducing an amount of heat conducted from the laser tracker to the object. The isolation plate may be comprised of a material selected from one of plastic, mica, wood, and ceramic. The plurality of channels may extend through the first plate, the second plate, and the isolation plate. The plurality of fasteners may secure the first plate, the second plate, and the isolation plate to each other. The plurality of insulating bushings may be located in at least a portion of the plurality of channels extending through the first plate. The plurality of insulating bushings may insulate the plurality of fasteners from the first plate.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
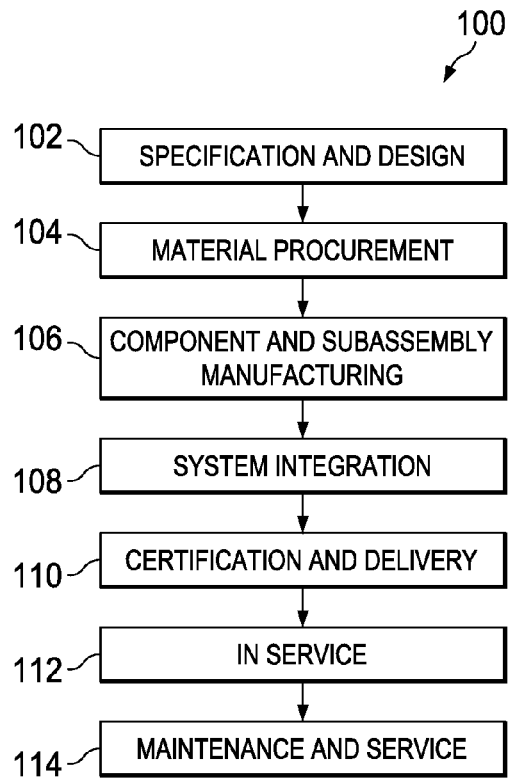
FIG. 1 is an illustration of an aircraft manufacturing and service method in accordance with an advantageous embodiment.
Figure 2:
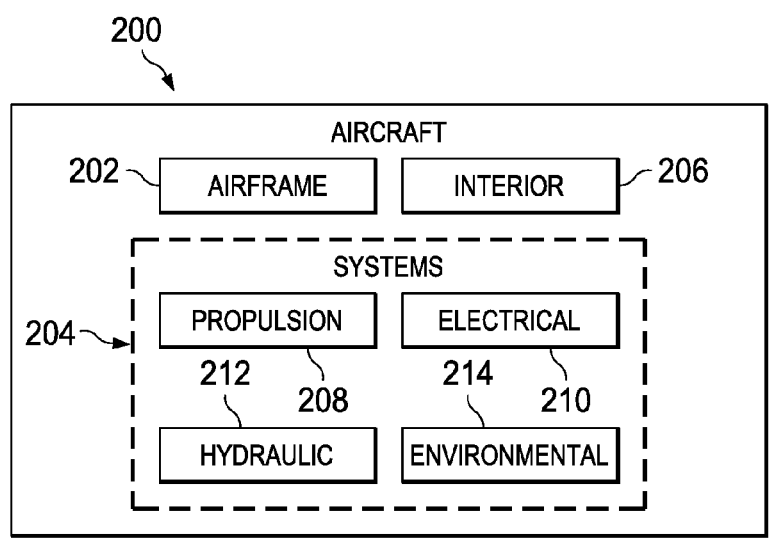
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of, or reducing the cost of, aircraft 200. Similarly, one or more of apparatus embodiments, method embodiments, or a combination thereof may be utilized while aircraft 200 is in service 112 or during maintenance and service 114 in FIG. 1.

The different advantageous embodiments recognize and take into account that currently used methods and apparatus for mounting coordinate measurement machines, such as laser trackers, may require a warm-up. The different advantageous embodiments recognize and take into account that the warm-up time needed may often be longer than desired.

The different advantageous embodiments recognize and take into account that, currently, a warm-up time of around 20 to around 36 hours may be needed for a laser tracker mounted onto a tool before the laser tracker can be used. The different advantageous embodiments recognize and take into account that the amount of time that may be needed to obtain results with an expected accuracy may be longer than desired.

Thus, the different advantageous embodiments may provide a method and apparatus for thermally isolating a coordinate measurement machine. In the illustrative examples, an apparatus may include a first plate, a second plate, and an insulating plate located between the first plate and the second plate. The first plate may be capable of receiving a mounting member for a coordinate measurement machine.

The second plate may be capable of being secured to a surface of an object. The insulating plate may be located between the first plate and the second plate. The first plate, the second plate, and the insulating plate may be secured to each other. The insulating plate may be capable of thermally isolating the coordinate measurement machine from the object.

Figure 3:
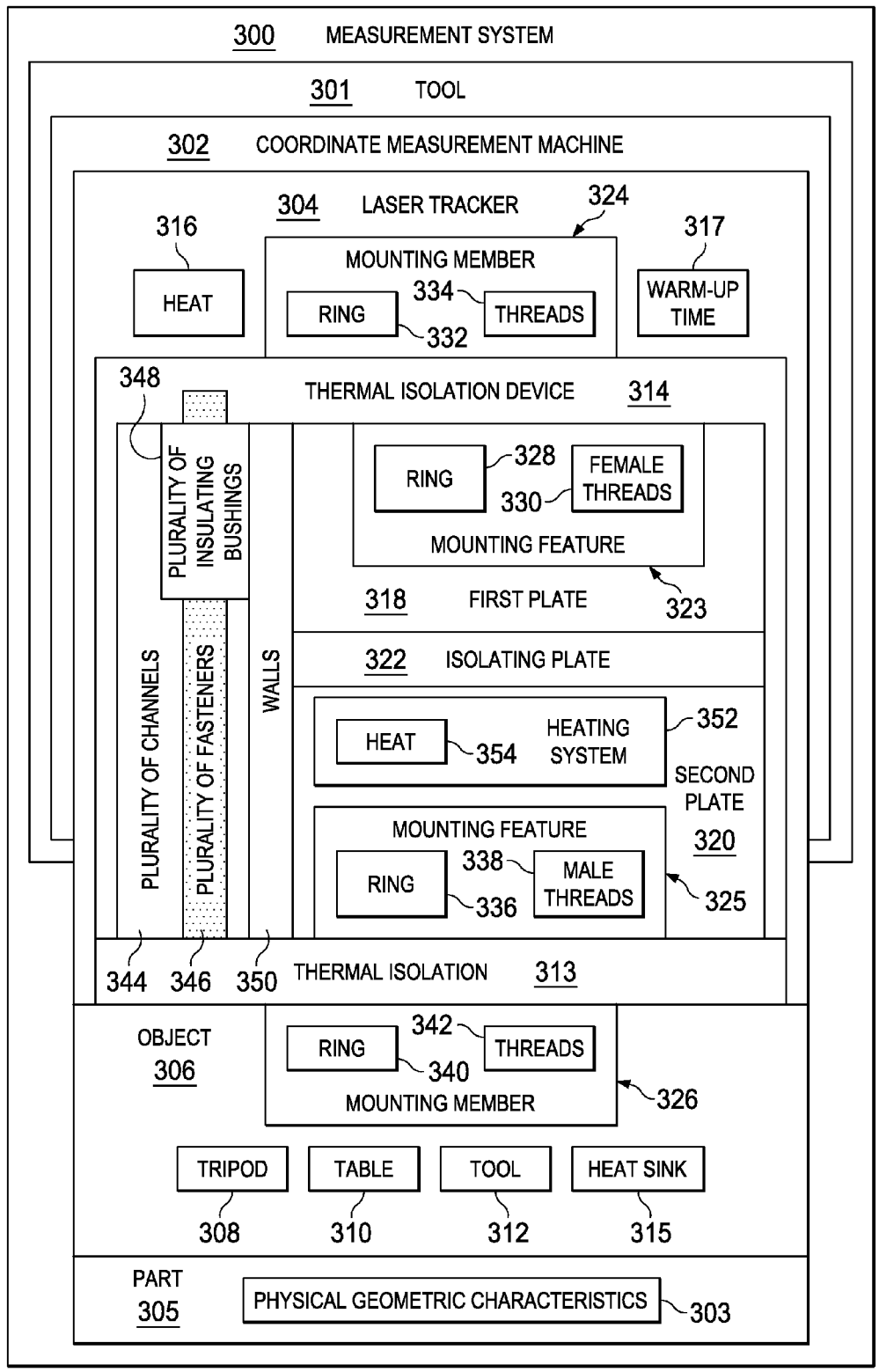
FIG. 3 is an illustration of a measurement system in which an advantageous embodiment may be implemented.

With reference now to FIG. 3, an illustration of a measurement system that may be implemented for use with aircraft 200 in FIG. 2 is depicted in accordance with an advantageous embodiment.

In this illustrative example, measurement system 300 may include tool 301. Tool 301 may be any tool that may require an operating temperature that remains substantially constant for operation. An operating temperature may be a temperature at which tool 301 may be used. For example, without limitation, tool 301 may be coordinate measurement machine 302.

Coordinate measurement machine 302 may be used to measure physical geometric characteristics 303 of part 305. Physical geometric characteristics 303 may include, for example, without limitation, a location in three-dimensional space, a width, an angle, an area, or some other suitable characteristic of part 305. Part 305 may take various forms. For example, without limitation, part 305 may be a spar, a wing panel, a strut, an engine, a bolt, or some other suitable component.

In these illustrative examples, coordinate measurement machine 302 may take the form of laser tracker 304. Of course, coordinate measurement machine 302 also may take other forms. For example, without limitation, coordinate measurement machine 302 may be a linear laser interferometer, a Doppler laser measurement machine, and/or some other suitable device. In these examples, laser tracker 304 may be mounted to object 306. Object 306 may take various forms. For example, without limitation, object 306 may be tripod 308, table 310, tool 312, and/or some other suitable object on which laser tracker 304 may be mounted. Tool 312 may be a tool used to machine part 305. In these illustrative examples, laser tracker 304 may be secured to object 306 using thermal isolation device 314.

Thermal isolation device 314 may be capable of isolating laser tracker 304 from object 306. If object 306 has a cooler temperature than laser tracker 304, object 306 may function as heat sink 315.

This isolation provided by thermal isolation device 314 may take the form of thermal isolation 313. Thermal isolation 313 may substantially reduce or prevent an exchange of heat between coordinate measurement machine 302 and object 306. In other words, the movement of heat 316 from laser tracker 304 to object 306 may be reduced and/or prevented. In this manner, warm-up time 317 for laser tracker 304 may be reduced. Object 306 may be heated to a temperature at which object 306 does not act has a heat sink and/or heat 316 does not transfer from coordinate measurement machine 302 to object 306 without thermal isolation device 314.

Thermal isolation device 314 may include first plate 318, second plate 320, and isolation plate 322. Isolation plate 322 may be located between first plate 318 and second plate 320. First plate 318, second plate 320, and isolation plate 322 may be secured to each other to form at least a portion of thermal isolation device 314.

First plate 318 may have mounting feature 323, which may be capable of being secured to mounting member 324 for coordinate measurement machine 302. Second plate 320 may have mounting feature 325 which may be capable of being secured to mounting member 326 on object 306.

Isolation plate 322 may be capable of thermally isolating coordinate measurement machine 302 from object 306 when thermal isolation device 314 is used to secure coordinate measurement machine 302 to object 306.

In this illustrative example, mounting feature 323 for first plate 318 may take the form of ring 328 with female threads 330. Mounting member 324 for coordinate measurement machine 302 may be a complimentary structure in the form of ring 332 and male threads 334. For example, female threads 330 on ring 328 may engage male threads 334 on ring 332. In a similar fashion, mounting feature 325 for second plate 320 may comprise ring 336 with threads 338.

Mounting member 326 for object 306 may be a complimentary structure to ring 336 and threads 338. Mounting member 326 may have ring 340 and threads 342. Threads 338 on ring 336 may engage threads 342 on ring 340 to secure thermal isolation device 314 to object 306.

In these illustrative examples, plurality of channels 344 may extend through first plate 318, second plate 320, and isolation plate 322. Plurality of fasteners 346 may be placed into plurality of channels 344 to secure first plate 318, second plate 320, and isolation plate 322 to each other.

Further, plurality of insulating bushings 348 may be placed into at least a portion of plurality of channels 344 extending through first plate 318. In other words, plurality of insulating bushings 348 may cover walls 350 in the portion of plurality of channels 344 extending through first plate 318. Plurality of fasteners 346 also may be in thermal contact with object 306 through second plate 320. In these examples, thermal contact may be a type of contact in which heat 316 may be transferred. Plurality of insulating bushings 348 may isolate first plate 318 from plurality of fasteners 346.

As a result, the transfer of heat 316 from coordinate measurement machine 302 through first plate 318 to plurality of fasteners 346 may be reduced and/or avoided. In this manner, heat 316 may not be transferred from plurality of fasteners 346 to second plate 320 and then to object 306.

In these illustrative examples, first plate 318, second plate 320, and isolation plate 322 may be comprised of various materials and may have various shapes. For example, without limitation, first plate 318 and/or second plate 320 may be comprised of a material, such as steel, brass, titanium, carbon fiber, and/or some other suitable material. First plate 318 and second plate 320 may be made from the same material or different materials.

Isolation plate 322 may be made of various materials that may provide a desired amount of thermal isolation. For example, without limitation, isolation plate 322 may be comprised of plastic, mica, wood, ceramic, and/or some other suitable material. The shape of these plates may vary. For example, without limitation, these plates may be rectangular, square, octagonal, circular, or some other suitable shape.

In some advantageous embodiments, heating system 352 may be present within thermal isolation device 314. Heating system 352 may provide a capability to heat object 306. By heating object 306, heat 316 may not be lost by laser tracker 304 to object 306. Heating system 352 may provide heat 354, which may flow into object 306 rather than heat 316 flowing to object 306. With heating system 352, another safeguard against movement of heat 316 from laser tracker 304 to object 306 may be used in addition to or instead of thermal isolation device 314.

The illustration of measurement system 300 is not meant to imply physical or architectural limitations to the manner in which measurement environments may be implemented. In some advantageous embodiments, other components in addition to, or in place of, the ones illustrated may be used. In yet other advantageous embodiments, some of the illustrated components may be omitted.

For example, in some advantageous embodiments, additional laser trackers, in addition to laser tracker 304, may be employed to measure part 305 or other parts. In yet other advantageous embodiments, plurality of channels 344 and plurality of fasteners 346 may be unnecessary. First plate 318 and second plate 320, with isolation plate 322 in between, may be attached to each other using other mechanisms such as, for example, without limitation, adhesive, bonding agents, and/or other suitable materials.

In some advantageous embodiments, mounting members 324 and 326 and mounting features 323 and 325 may take forms other than rings with threads that engage each other.

With the use of thermal isolation device 314 in these illustrative examples, warm-up time 317 for laser tracker 304 may be reduced from around 20 to around 36 hours to around 20 minutes. As yet another example, tool 301 may be a tool other than coordinate measurement machine 302 and may not be used in measurement system 300. Tool 301 may be for example, without limitation, a laser inferometer, and/or any other device that may require a substantially constant operating temperature.

Figure 4:
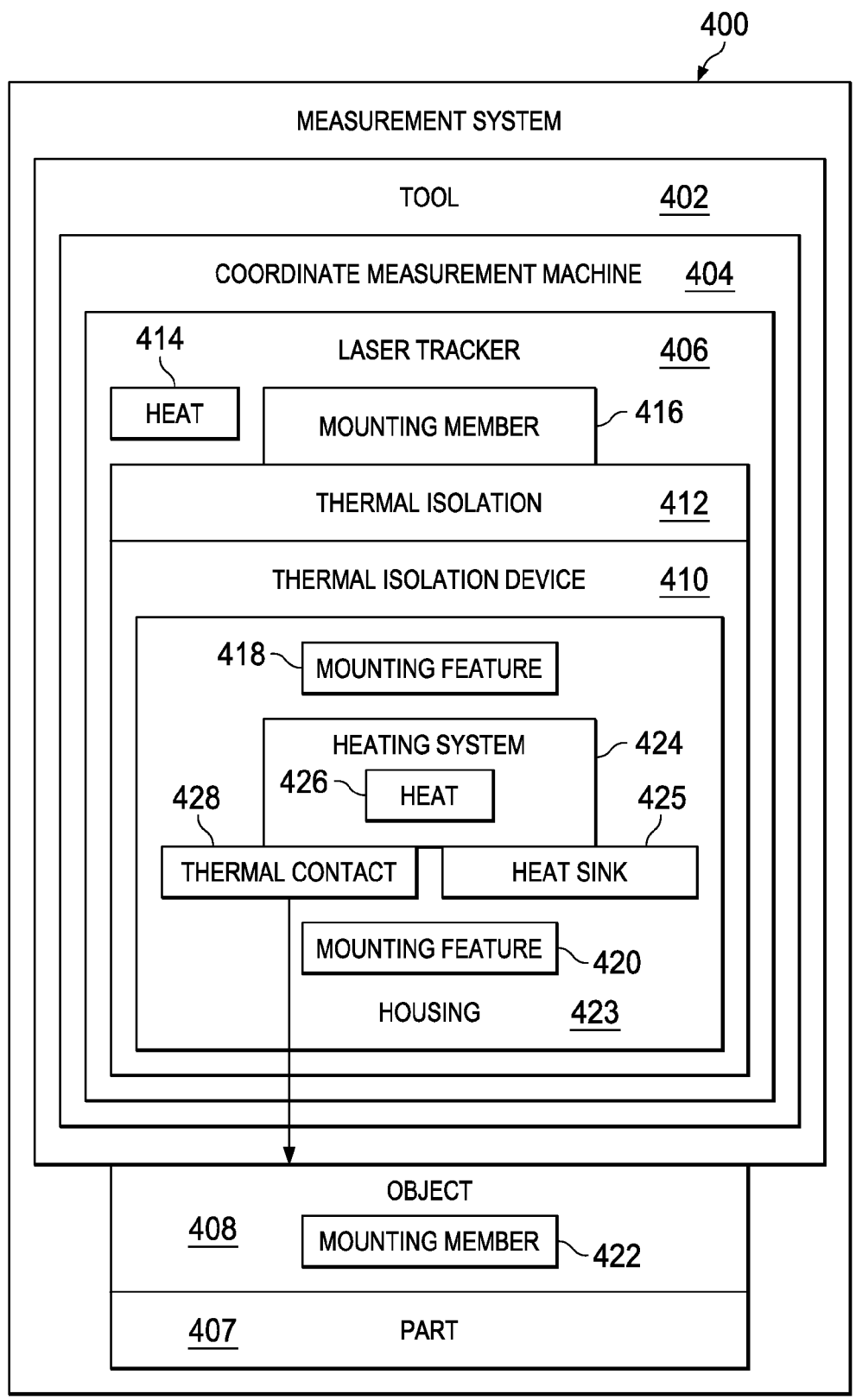
FIG. 4 is an illustration of a measurement system that may be implemented for use with an aircraft in accordance with an advantageous embodiment.

Turning next to FIG. 4, an illustration of a measurement system that may be implemented for use with aircraft 200 in FIG. 2 is depicted in accordance with an advantageous embodiment. In this illustrative example, measurement system 400 may include tool 402. Tool 402 may be any tool that may require an operating temperature that remains substantially constant for operation. An operating temperature may be a temperature at which tool 402 may be used. For example, without limitation, tool 402 may be coordinate measurement machine 404. Coordinate measurement machine 404, in this illustrative example, may be laser tracker 406. In this example, laser tracker 406 may be used to measure part 407.

Laser tracker 406 may be mounted to object 408 using thermal isolation device 410. Thermal isolation device 410 may provide thermal isolation 412 between laser tracker 406 and object 408 in this illustrative example. In other words, thermal isolation device 410 may substantially reduce the flowing of heat 414 to object 408.

In this illustrative example, laser tracker 406 may be secured to thermal isolation device 410 through mounting member 416, which may engage mounting feature 418 on thermal isolation device 410. Thermal isolation device 410 may be mounted onto object 408 using mounting feature 420. Mounting feature 420 may engage mounting member 422 on object 408.

In this depicted example, thermal isolation device 410 may include housing 423 and heating system 424. Thermal isolation device 410 also may include heat sink 425 and/or other suitable components.

Heating system 424 may be associated with housing 423. In other words, heating system 424 may be located inside of housing 425 and/or attached to housing 425. Heating system 424 may generate heat 426. Heat 426 may flow into object 408 via heat sink 425. Heating system 424 may generate heat 426 in a manner that may minimize and/or substantially reduce the flow of heat 414 from laser tracker 406 through thermal isolation device 410 into object 408.

In these illustrative examples, heating system 424 may be any device capable of emitting heat 426. For example, without limitation, heating system 424 may be a cathode heater, a semiconductor heater, an electronic heat generating device, and/or any other suitable device capable of generating heat 426.

Heat sink 425 may be any device capable of absorbing heat 426 and directing heating 426 to object 408. Heat sink 425 may provide thermal contact 428 to object 408.

Housing 423 may be a single structure or multiple structures. For example, housing 423 may comprise first plate 318 and second plate 320 in FIG. 3.

The illustration of thermal isolation device 410 in measurement system 400 in FIG. 4_is not meant to imply physical or architectural limitations on the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments. For example, a temperature sensor and a controller may be present part of heating system 424 and may regulate heat 426.

Figure 5:
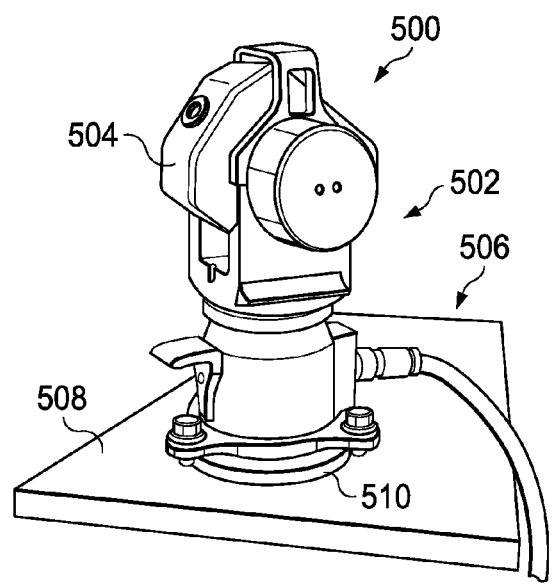
FIG. 5 is an illustration of a coordinate measurement machine secured to an object with a thermal isolation device in accordance with an advantageous embodiment.

With reference now to FIG. 5, an illustration of a coordinate measurement machine secured to an object with a thermal isolation device is depicted in accordance with an advantageous embodiment. In this illustrative example, measurement system 500 is an example of one implementation for measurement system 300 in FIG. 3.

In this illustrative example, coordinate measurement machine 502 takes the form of laser tracker 504. Laser tracker 504 may be implemented using any commercially available laser tracker. For example, without limitation, laser tracker 504 may be implemented using a Laser Tracker X V2 or a Laser Tracker Xi V2 available from Faro Technologies, Inc. Of course, laser tracker 504 may be implemented using any suitable laser tracker that may be available.

As illustrated, laser tracker 504 may be secured to object 506 in the form of table 508. Laser tracker 504 may be secured to table 508 using thermal isolation device 510. In these illustrative examples, thermal isolation device 510 may isolate laser tracker 504 from table 508. This isolation is a thermal isolation.

Figure 6:
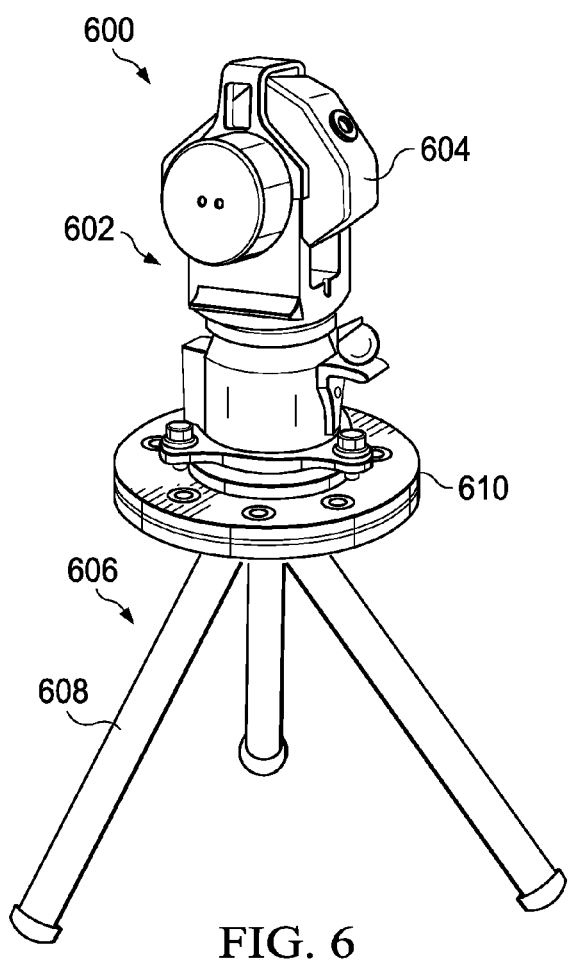
FIG. 6 is another illustration of a coordinate measurement machine secured to an object using a thermal isolation device in accordance with an advantageous embodiment.

With reference now to FIG. 6, another illustration of a coordinate measurement machine secured to an object using a thermal isolation device is depicted in accordance with an advantageous embodiment. In this example, measurement system 600 is an example of another implementation for measurement system 300 in FIG. 3. Coordinate measurement machine 602 takes the form of laser tracker 604, which may be secured to object 606. In this illustrative example, object 606 may take the form of tripod 608. In this illustrative example, laser tracker 604 may be thermally isolated from tripod 608 by thermal isolation device 610.

Figure 7:
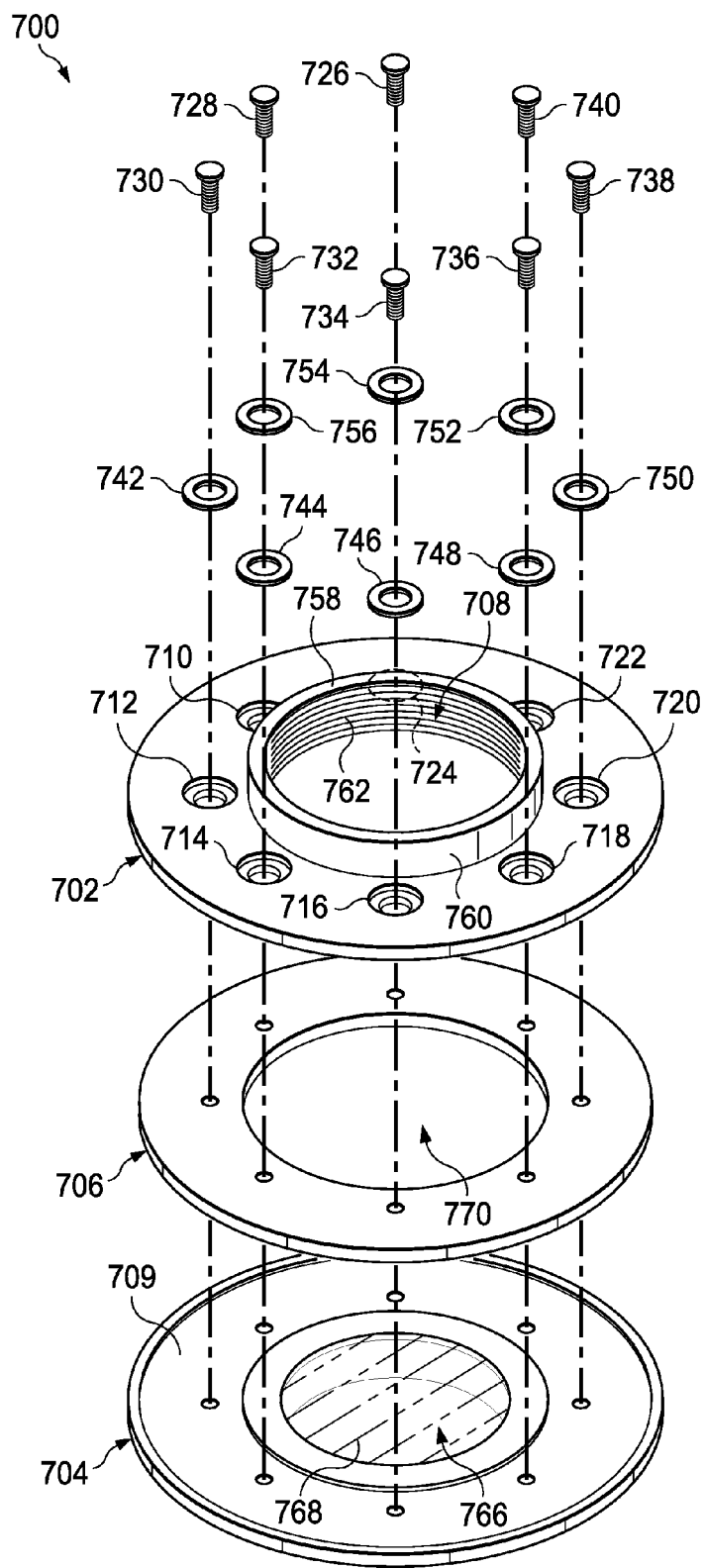
FIG. 7 is an illustration of an exploded view of a thermal isolation device in accordance with an advantageous embodiment.

With reference now to FIG. 7, an illustration of an exploded view of a thermal isolation device is depicted in accordance with an advantageous embodiment. In this illustrative example, thermal isolation device 700 is an example of thermal isolation device 510 in FIG. 5 and thermal isolation device 610 in FIG. 6.

Thermal isolation device 700 may include first plate 702, second plate 704, and isolation plate 706. Isolation plate 706 may be located between first plate 702 and second plate 704. In this example, second plate 704 may have recess 709. Recess 709 may be configured to receive and/or hold isolation plate 706 in place. Recess 709 also may provide for increased lateral rigidity of isolation plate 706.

In this depicted example, hole 708 may extend through first plate 702, isolation plate 706, and second plate 704. In this illustrative example, holes 710, 712, 714, 716, 718, 720, 722, and 724 extend through first plate 702, isolation plate 706, and second plate 704. Fasteners 726, 728, 730, 732, 734, 736, 738, and 740 may be placed into holes 710, 712, 714, 716, 718, 720, 722, and 724 to secure first plate 702, isolation plate 706, and second plate 704 to each other.

Additionally, insulating bushings 742, 744, 746, 748, 750, 752, 754, and 756 may be placed into the portion of holes 710, 712, 714, 716, 718, 720, 722, and 724 passing through first plate 702. These insulating bushings may insulate fasteners 726, 728, 730, 732, 734, 736, 738, and 740 from first plate 702. In this manner, fasteners 726, 728, 730, 732, 734, 736, 738, and 740 may not conduct heat away from first plate 702 to second plate 704 during use.

As can be seen in this illustrative example, first plate 702 may have mounting feature 758, which may be ring 760 with female threads 762. Female threads 762 may engage a laser tracker such as, for example, laser tracker 504 in FIG. 5 and/or laser tracker 604 in FIG. 6.

As can be seen in this illustrative example, opening 766 in second plate 704 may be part of hole 708. Opening 766 may have cover 768, which may substantially reduced or prevent air from passing though opening 766 into hole 708. In this manner, airflow may be reduced or prevented between coordinate measurement machine 302 and object 306. Cover 768 is shown in phantom in this example and may not be present in some advantageous embodiments. In other advantageous embodiments, isolation plate 706 may not have opening 770 and/or cover 768 may be installed in opening 770. Cover 768 also may be removable or permanent in the different advantageous embodiments. In yet other embodiments, cover 768 may be installed in opening 770.

Figure 8:
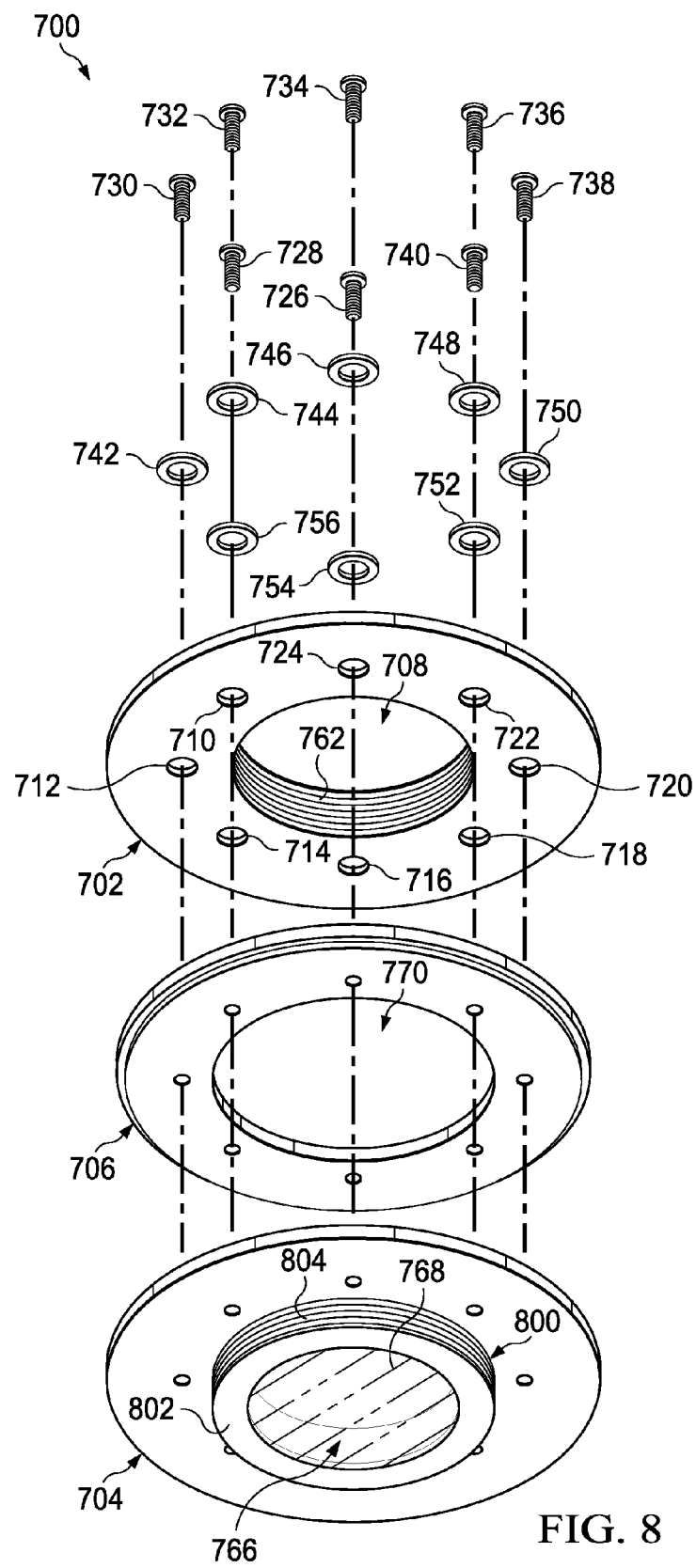
FIG. 8 is an illustration of an exploded perspective view of a thermal isolation device in accordance with an advantageous embodiment.

With reference now to FIG. 8, an illustration of an exploded perspective view of a thermal isolation device is depicted in accordance with an advantageous embodiment.

In this view, second plate 704 may have mounting member 800. Mounting member 800 may take the form of ring 802 with threads 804. Ring 802 with male threads 804 may be secured to an object such as, for example, table 508 in FIG. 5 and/or tripod 608 in FIG. 6.

Figure 9:
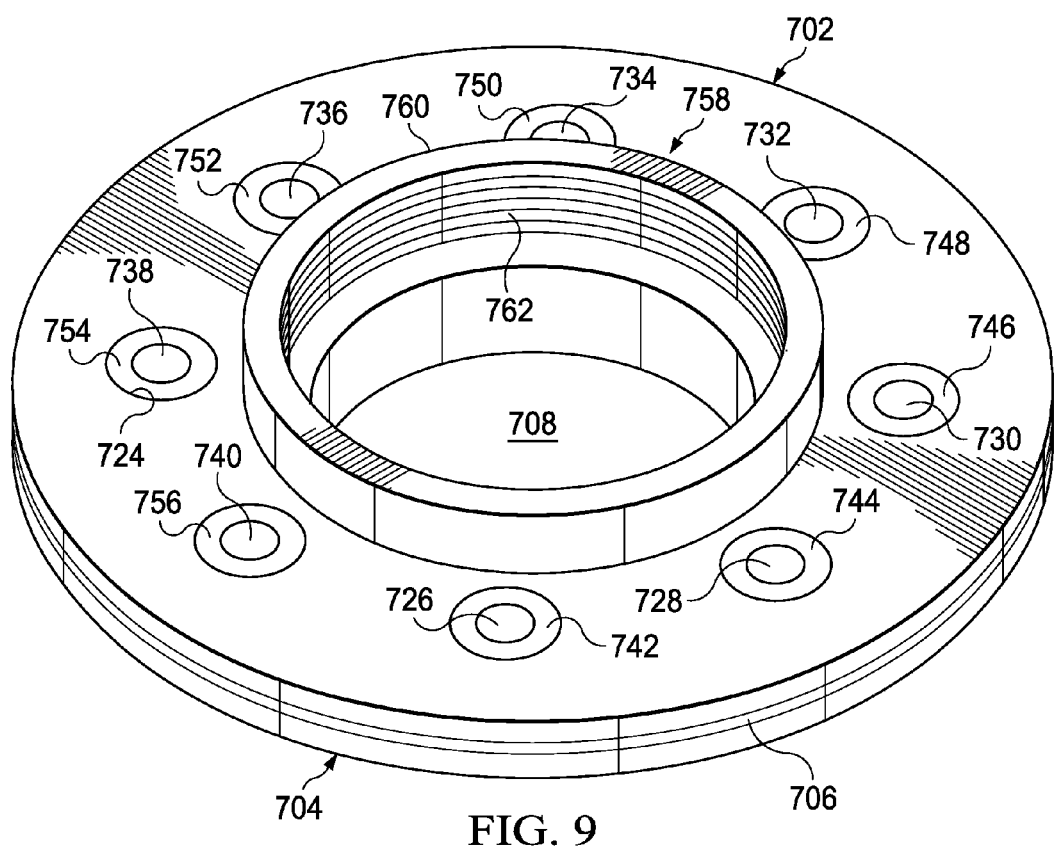
FIG. 9 is an illustration of a perspective view of a thermal isolation device in accordance with an advantageous embodiment.

Turning next to FIG. 9, an illustration of a perspective view of a thermal isolation device is depicted in accordance with an advantageous embodiment. In this illustrative example, thermal isolation device 700 is depicted in an assembled configuration. In this configuration, thermal isolation device 700 may be used to secure coordinate measurement machine 302 in FIG. 3 to object 306 in FIG. 3. In addition, thermal isolation device 700 may provide for thermal isolation between coordinate measurement machine 302 and object 306.

Figure 10:
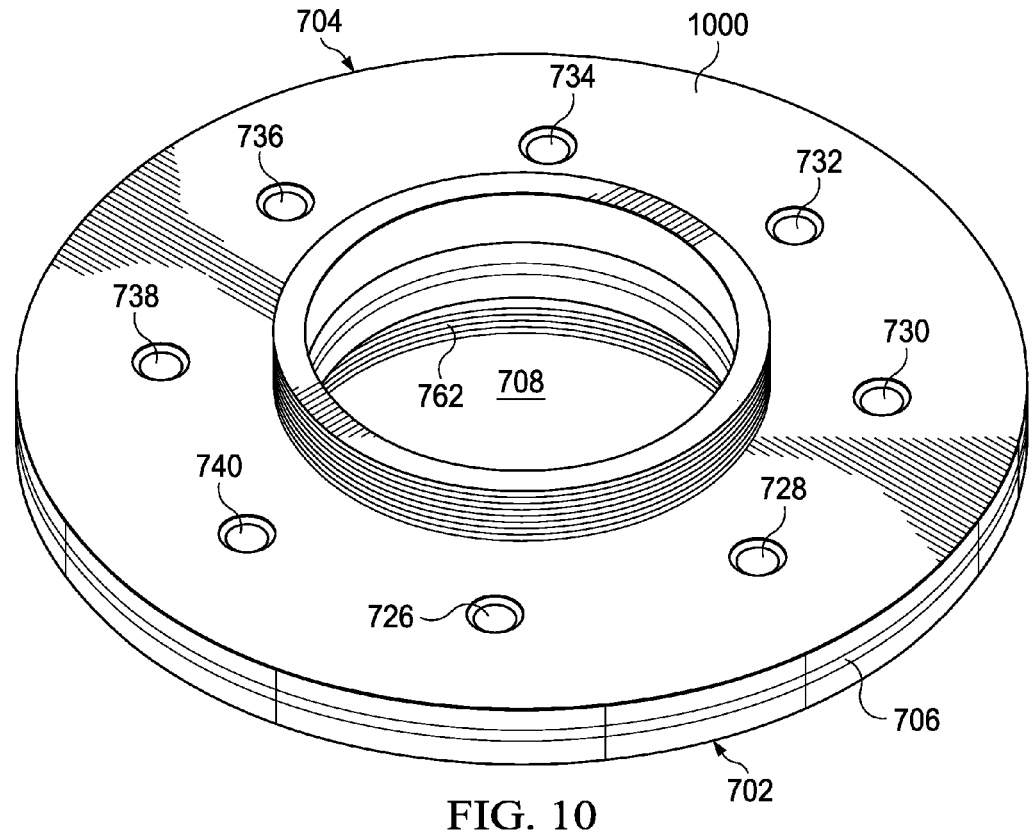
FIG. 10 is an illustration of another perspective view of a thermal isolation device in accordance with an advantageous embodiment.

Turning now to FIG. 10, an illustration of another perspective view of a thermal isolation device is depicted in accordance with an advantageous embodiment. In this example, bottom side 1000 of thermal isolation device 700 may be seen.

Figure 11:
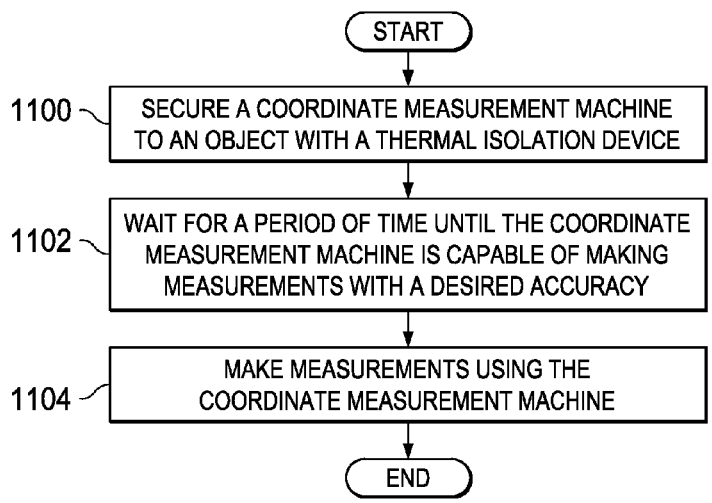
FIG. 11 is an illustration of a flowchart of a process for operating a coordinate measurement machine in accordance with an advantageous embodiment.

With reference now to FIG. 11, an illustration of a flowchart of a process for operating a coordinate measurement machine is depicted in accordance with an advantageous embodiment. In this example, coordinate measurement machine 302 may be secured to object 306 with thermal isolation device 314 (operation 1100). The process may then wait for a period of time until coordinate measurement machine 302 is capable of making measurements with a desired accuracy (operation 1102). The process may then make measurements using coordinate measurement machine 302 (operation 1104), with the process terminating thereafter.

By using thermal isolation device 314, a period of time, such as warm-up time 317, needed until coordinate measurement machine 302 is capable of making measurements with a desired accuracy may be reduced as compared to the period of time needed without thermal isolation device 314.

Figure 12:
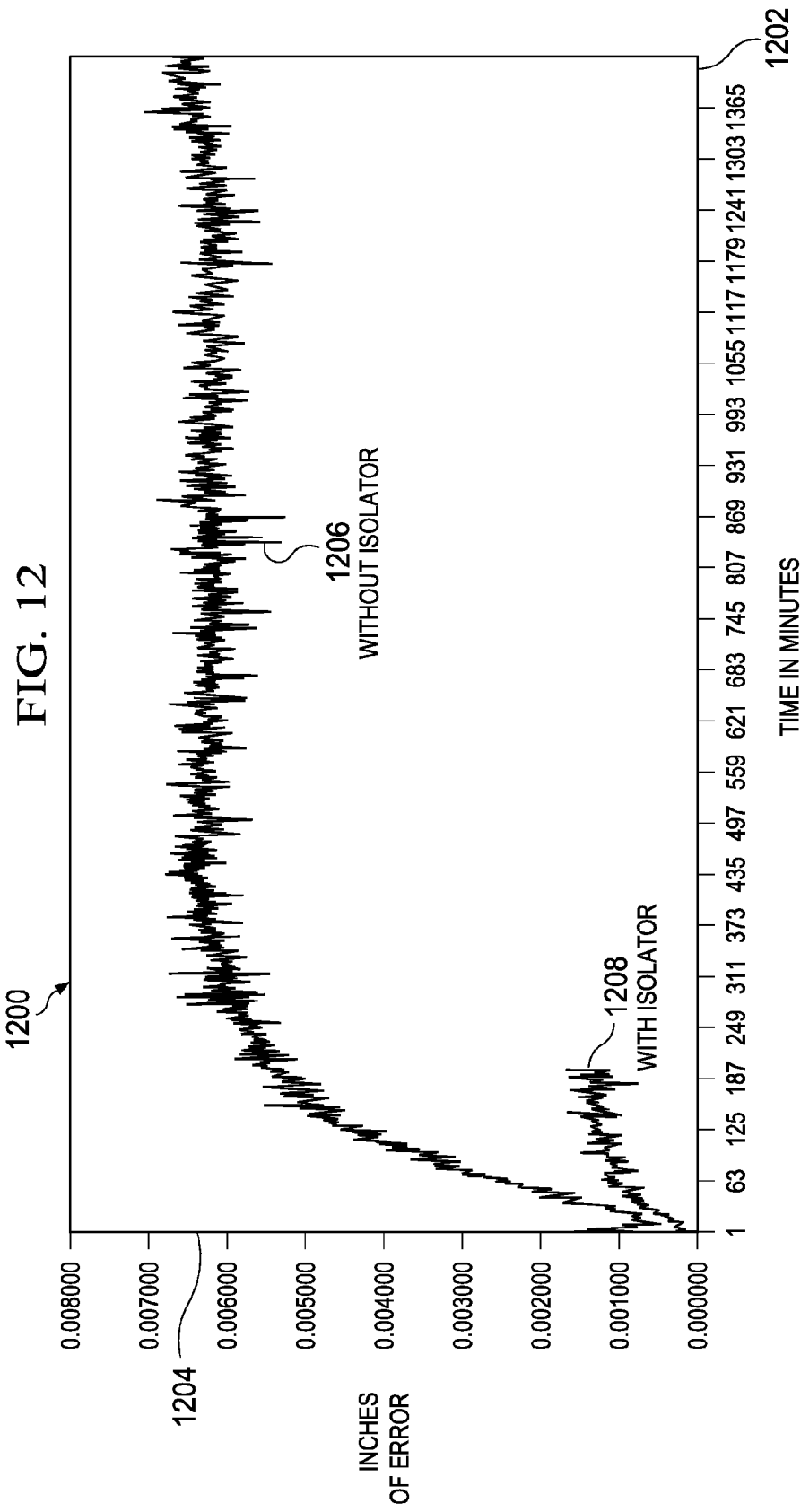
FIG. 12 is an illustration of stabilization times in accordance with an advantageous embodiment.

With reference now to FIG. 12, an illustration of stabilization times is depicted in accordance with an advantageous embodiment. In this example, graph 1200 illustrates stabilization times for a coordinate measurement machine with and without a thermal isolation device. In these examples, the coordinate measurement machine may be laser tracker 304 in FIG. 3. X-axis 1202 may represent time in minutes, while y-axis 1204 may represent error in inches.

Line 1206 may represent a laser tracker without a thermal isolation device such as, for example, without limitation, thermal isolation device 314 in FIG. 3. As can be seen in this example, the error may drift over time. In other words, this configuration of a laser tracker without a thermal isolation device may take many hours to stabilize.

Line 1208 may illustrate a configuration in which laser tracker 304 may be attached to object 306 with thermal isolation device 314. As can be seen, line 1208 may show that the error in y-axis 1204 stabilizes more quickly as compared to line 1206.

Further, the error in y-axis 1204 may not drift over time as compared to line 1206. With this configuration, the laser tracker may be more quickly used. For example, the laser tracker may be ready for use in around 20 minutes as compared to around 20 to around 36 hours without thermal isolation device 314. As can be seen, the amount of time needed for the error in y-axis 1204 to stabilize may be less than the configuration in which thermal isolation device 314 is not used.

Thus, the different advantageous embodiments may provide a capability to reduce the amount of time that may be needed to warm up a coordinate measurement machine, such as a laser tracker. The different advantageous embodiments may provide a capability to isolate the laser tracker from the object to which the laser tracker is mounted. In this manner, the movement of heat from the laser tracker to the object may be reduced and/or eliminated. As a result, changes in the laser tracker that may be caused by temperature changes in the housing and/or other materials in the laser tracker may be reduced and/or eliminated.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a first plate configured to receive a mounting member for a tool requiring an operating temperature that remains substantially constant for operation of the tool;
a second plate secured to an object; and
an isolation plate located between the first plate and the second plate, wherein the first plate, the second plate, and the isolation plate are secured to each other such that the first plate does not move relative to the second plate and the isolation plate substantially thermally isolates the tool from the object, the object supporting the first plate, the second plate, and the isolation plate.

2. The apparatus of claim 1, wherein the tool is a coordinate measurement machine.

3. The apparatus of claim 1 further comprising:
a plurality of channels extending through the first plate, the second plate, and the isolation plate;
a plurality of fasteners in the plurality of channels, wherein the plurality of fasteners secures the first plate, the second plate, and the isolation plate to each other; and
a plurality of insulating bushings located in at least a portion of the plurality of channels extending through the first plate, wherein the plurality of insulating bushings insulates the plurality of fasteners from the first plate.

4. The apparatus of claim 1, wherein the first plate has a ring with threads capable of engaging the mounting member.

5. The apparatus of claim 1, wherein the second plate has a threaded member capable of being coupled to a channel in the object.

6. The apparatus of claim 1, wherein the first plate is comprised of a material selected from one of steel, brass, titanium, and a carbon fiber.

7. The apparatus of claim 6, wherein the second plate is comprised of a material selected from one of steel, brass, titanium, and a carbon fiber.

8. The apparatus of claim 1, wherein the isolation plate is comprised of a material selected from one of plastic, mica, wood, and ceramic.

9. The apparatus of claim 1, wherein the isolation plate is comprised of a material having a thermal conductivity capable of reducing an amount of heat conducted from the tool to the object.

10. The apparatus of claim 1, wherein the object is selected from one of a tripod, a table, and a tool.

11. A measurement system comprising:
an object selected from one of a tripod, a table, and a tool;
a coordinate measurement machine;
a laser tracker;
a thermal isolation device comprising:
a first plate configured to receive a mounting member for the coordinate measurement machine, wherein the first plate is comprised of a material selected from one of steel, brass, titanium, and a carbon fiber;
a second plate secured to the object, wherein the second plate has a threaded member configured to couple to a channel in the object and wherein the second plate is comprised of a material selected from one of steel, brass, titanium, and a carbon fiber;
an isolation plate located between the first plate and the second plate, wherein the first plate, the second plate, and the isolation plate are secured to each other and the isolation plate substantially thermally isolates the laser tracker from the object, wherein the isolation plate is comprised of a material having a thermal conductivity that reduces an amount of heat conducted from the laser tracker to the object, and wherein the isolation plate is comprised of a material selected from one of plastic, mica, wood, and ceramic;
a plurality of channels extending through the first plate, the second plate, and the isolation plate;
a plurality of fasteners in the plurality of channels, wherein the plurality of fasteners secures the first plate, the second plate, and the isolation plate to each other; and
a plurality of insulating bushings located in at least a portion of the plurality of channels extending through the first plate, wherein the plurality of insulating bushings insulates the plurality of fasteners from the first plate, and
the object configured to support the thermal isolation device.

12. A method for operating a coordinate measurement machine, the method comprising:
securing the coordinate measurement machine to an object with a thermal isolation device to form a secured coordinate measurement machine,
wherein the thermal isolation device comprises:
a first plate configured to receive a mounting member for the coordinate measurement machine;
a second plate secured to an object that supports the coordinate measurement machine; and
an isolation plate located between the first plate and the second plate, wherein the first plate, the second plate, and the isolation plate are secured to each other and the isolation plate is capable of thermally isolating the coordinate measurement machine from the object; and
making measurements using the secured coordinate measurement machine.

13. The method of claim 12 further comprising:
waiting for a period of time until the secured coordinate measurement machine is capable of making the measurements with a desired accuracy before making the measurements.

14. The method of claim 12, wherein the thermal isolation device further comprises:
a plurality of channels extending through the first plate, the second plate, and the isolation plate;
a plurality of fasteners in the plurality of channels, wherein the plurality of fasteners secure the first plate, the second plate, and the isolation plate to each other; and
a plurality of insulating bushings located in at least a portion of the plurality of channels extending through the first plate, wherein the plurality of insulating bushings insulates the plurality of fasteners from the first plate.

15. The method of claim 12, wherein the first plate has a ring with threads capable of engaging the mounting member.

16. The method of claim 12, wherein the second plate has a threaded member capable of being coupled to a channel in the object.

17. The method of claim 12, wherein the first plate is comprised of a material selected from one of steel, brass, titanium, and a carbon fiber.

18. The method of claim 12, wherein the second plate is comprised of a material selected from one of steel, brass, titanium, and a carbon fiber.

19. The method of claim 12, wherein the isolation plate is comprised of a material selected from one of plastic, mica, wood, and ceramic.

20. The method of claim 12, wherein the isolation plate is comprised of a material having a thermal conductivity capable of reducing an amount of heat conducted from the coordinate measurement machine to the object.

21. A method for operating a laser tracker, the method comprising:
   securing a coordinate measurement machine to an object with a thermal isolation device to form a secured laser tracker, the object configured to support the coordinate measurement machine;
   waiting for a period of time until the secured laser tracker is capable of making measurements with a desired accuracy;
   making the measurements using the secured laser tracker after the period of time has passed, wherein the thermal isolation device comprises:
      a first plate configured to receive a mounting member for the coordinate measurement machine, wherein the first plate is comprised of a material selected from one of steel, brass, titanium, and a carbon fiber;
      a second plate secured to the object, wherein the second plate has a threaded member coupled to a channel in the object and wherein the second plate is comprised of a material selected from one of steel, brass, titanium, and a carbon fiber;
      an isolation plate located between the first plate and the second plate, wherein the first plate, the second plate, and the isolation plate are secured to each other and the isolation plate is capable of thermally isolating the laser tracker from the object, wherein the isolation plate is comprised of a material having a thermal conductivity capable of reducing an amount of heat conducted from the laser tracker to the object, and wherein the isolation plate is comprised of a material selected from one of plastic, mica, wood, and ceramic;
      a plurality of channels extending through the first plate, the second plate, and the isolation plate;
      a plurality of fasteners in the plurality of channels, wherein the plurality of fasteners secures the first plate, the second plate, and the isolation plate to each other; and
      a plurality of insulating bushings located in at least a portion of the plurality of channels extending through the first plate, wherein the plurality of insulating bushings insulates the plurality of fasteners from the first plate.

* * * * *